UNITED STATES PATENT OFFICE.

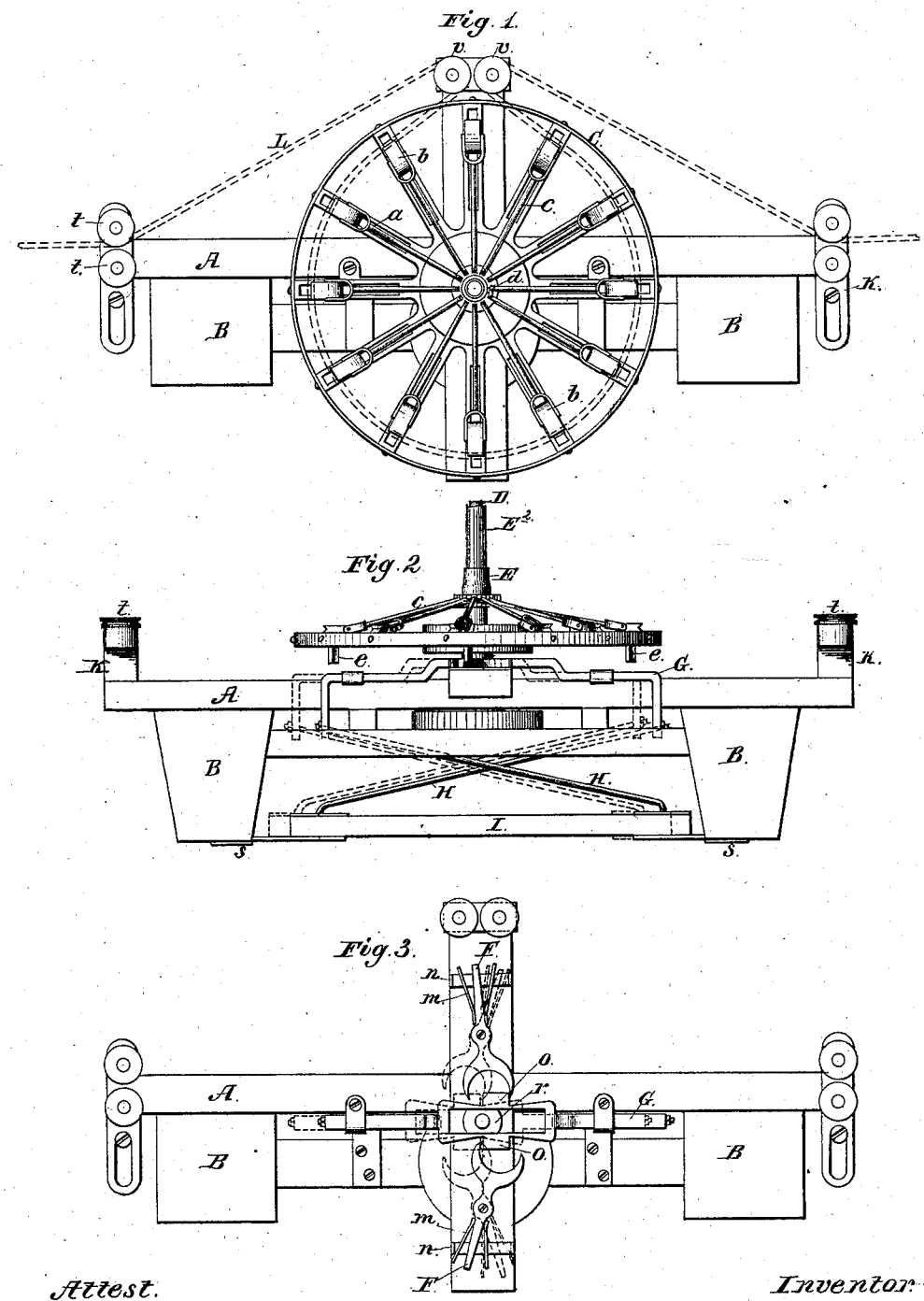

STEPHEN LYON, OF CHETOPAH, KANSAS.

IMPROVEMENT IN CORN-PLANTERS.

Specification forming part of Letters Patent No. 193,978, dated August 7, 1877; application filed April 24, 1877.

*To all whom it may concern:*

Be it known that I, STEPHEN LYON, of Chetopah, in the county of Labette, in the State of Kansas, have invented new and useful Improvements in Corn-Planters, fully set forth in the following specification and the drawings forming a part thereof.

My invention relates to that class of machines known as "check-rowers," guided and operated by a rope extending across and staked on each side of the field to be planted. Difficulty has been experienced in adjusting the space between the rows in the line of the rope, and in the complicated devices for operating the seed-valves. To more completely overcome these difficulties is the object of my improvements. They consist in an adjustable check-wheel, having pivoted radial arms, sliding collar, and blocks, for changing the distance between rows in line with the draft, and in mechanism for operating the grain-valves, as hereinafter described.

In the drawing, Figure 1 shows a plan view of an adjustable check-wheel and pulleys. Fig. 2 is an elevation, showing the wheel and the mechanism for working the seed-valves; and Fig. 3 is a plan view with the check-wheel removed, showing the devices for converting rotary into reciprocating motion.

A represents the frame of the machine; B, the seed-boxes, and C the adjustable check-wheel. The wheel is loosely supported on a fixed vertical post, D, and has slotted arms $a$, in which the adjustable blocks $b$ rest. The blocks have a pin or projection to guide them in the slots, and a notched or irregular groove in front to receive the rope and prevent it from slipping. They are connected to an adjustable collar, E, (on a thimble, $E^2$, extending vertically from the hub of the wheel and incasing the fixed post,) by arms $c$, which are pivoted both to the blocks and the collar, the latter being held in place by a pin, $d$. By raising or lowering the collar on the thimble the blocks are drawn in or out, increasing or diminishing the circumference of the wheel, and causing it to be revolved slower or faster, similarly to effect the dropping of the grain, and consequently the distance between the rows planted.

To the arms of the wheel, and projecting below them, are trip-pins $e$, adjusted by means of a slot and set-screw; and they may be provided with a flange or other suitable contrivance to keep them from turning out of position.

The pins strike against and operate the long arm of the levers F, each provided with two retracting-springs, $m$, and stops $n$.

The extent of motion of the levers is regulated by the position of the adjustable trip-pins.

The short arms of the levers are bifurcated to strike stops $o$ on each side of a reciprocating bridge, G.

The bridge is slotted a portion of its length, and moves upon a guide-block, $r$, on the vertical post. The arms of the bridge are bent down at their ends, and to them are attached cross-rods H, that are connected to and operate the sliding valve-bar I.

To the ends of this bar are made slide-valves $s$, so as to open and close the openings of the seed-boxes.

On the ends of the frame, at the sides of the machine, are adjustable supports K for the side pulleys $t$, and on the front of the frame are pulleys $v$.

Both ends of the cord L are fastened on opposite sides of the corn-field by suitable and convenient means for bringing the rope on a plane with the pulleys, which rope is then brought around the pulleys and check-wheel, as shown, the side pulleys acting as guides, and the front ones serving to avoid the crossing and wearing of the rope.

There are two pulleys on the side of the machine, and they become interchangeable as the machine moves in opposite directions.

I do not claim an adjustable check-wheel, nor do I claim to be the first inventor of a device for adjusting the radial arms of such a wheel all at once.

I claim—

1. The combination, with the check-wheel having radial arms, of the sliding collar, the grooved adjustable blocks, and the pivoted arms, for changing the circumference of the check-wheel.

2. The combination, with the check-wheel and trip-pin, of the bifurcated levers, their springs and stops, and the slotted bridge for actuating the seed-slides, substantially as described.

3. The combination, with the bridge G, of the cross-bars H, bar I, and sliding valves s, for dropping the grain, substantially as described.

In witness whereof I hereunto subscribe my name, in the presence of two attesting witnesses, this 5th day of February, 1877.

STEPHEN LYON. [L. S.]

Witnesses:
ELWIN W. BEDELL,
WILLIAM G. HOOVER.